July 31, 1962     E. J. BARTH ETAL     3,046,807
DOUBLE COUNTERSHAFT MULTISPEED TRANSMISSION
Filed Aug. 12, 1958                                   8 Sheets-Sheet 1

FIG. 1

INVENTORS
ELMER J. BARTH
CARL J. GUSTAFSSON
BY
ATTORNEY

FIG. 2

INVENTORS
ELMER J. BARTH
CARL J. GUSTAFSSON
BY
*Lawrence C. Witker*
ATTORNEY

FIG. 3

July 31, 1962    E. J. BARTH ETAL    3,046,807
DOUBLE COUNTERSHAFT MULTISPEED TRANSMISSION
Filed Aug. 12, 1958     8 Sheets-Sheet 3

INVENTORS
ELMER J. BARTH
CARL J. GUSTAFSSON
BY
*Lawrence C. Witker*
ATTORNEY

July 31, 1962 E. J. BARTH ETAL 3,046,807
DOUBLE COUNTERSHAFT MULTISPEED TRANSMISSION
Filed Aug. 12, 1958 8 Sheets-Sheet 4

FIG. 4

INVENTORS
ELMER J. BARTH
CARL J. GUSTAFSSON
BY
*Lawrence C. Witker*
ATTORNEY

INVENTORS
ELMER J. BARTH
CARL J. GUSTAFSSON

July 31, 1962 E. J. BARTH ET AL 3,046,807
DOUBLE COUNTERSHAFT MULTISPEED TRANSMISSION
Filed Aug. 12, 1958 8 Sheets-Sheet 7

INVENTORS
ELMER J. BARTH
CARL J. GUSTAFSSON
BY
*Lawrence C. Witker*
ATTORNEY

July 31, 1962 E. J. BARTH ETAL 3,046,807
DOUBLE COUNTERSHAFT MULTISPEED TRANSMISSION
Filed Aug. 12, 1958 8 Sheets-Sheet 8

INVENTORS
ELMER J. BARTH
CARL J. GUSTAFSSON
BY
Lawrence C. Witker
ATTORNEY 3,046,807
DOUBLE COUNTERSHAFT MULTISPEED TRANSMISSION
Elmer J. Barth, 2526 Drummond Road, and Carl J. Gustafsson, 2946 Edgebrook Drive, both of Toledo, Ohio
Filed Aug. 12, 1958, Ser. No. 754,637
12 Claims. (Cl. 74—331)

This invention relates generally to change speed gearing and is particularly directed to automotive transmissions of the double countershaft, constant mesh gear type, particularly adapted for use in heavy duty vehicles, such as trucks.

A primary object of the invention is to provide a fully synchronized unit power transmission wherein the difference between the lowest and highest speed ratios is high and in which a large number of intermediate ratios are available for utilizing the engine at its maximum, peak efficiency under all conditions without the use of auxiliary transmissions or two speed axles. The transmission structure is provided with an input shaft, an output shaft, a pair of countershafts, a plurality of change speed gears arranged in a novel manner in relation to each other and which are carried on the aforementioned shafts, a plurality of shifting means located between some of the gears to selectively include any of the gears in the power trains, means for operating the shifting means, some of which are power operated and others of which are manually operated, further shifting means being provided for conditioning the transmission for forward, neutral and reverse operations. The foregoing arrangement provides a structure wherein a minimum number of change speed gears are sufficient for obtaining a large number of speed ratios in an envelope size comparable to the present day five speed transmissions.

A further object is to provide a transmission structure which is simple in construction, efficient in operation, inexpensive to assemble and manufacture and is of minimum size and weight.

Further objects and advantages will become apparent upon reading the following specification, together with the accompanying drawings which form a part hereof.

The invention is here shown embodied in a unit power transmission having twelve forward and six reverse ratios. A casing, or housing, contains what is basically a fully synchronized three-speed countershaft transmission including means to split the three speeds to produce six speed ratios. A second countershaft is utilized for another range whereby the six speed ratios are multiplied to produce twelve forward and six reverse speed ratios. The selection of the speed ratios is accomplished by means of a shift lever for shifting the basic three speed transmission, the means for splitting the input power to the countershaft of the three speed unit and the diverting of the output power through the second countershaft is accomplished automatically by power cylinders subsequent to preselection by separate manual controls carried on the shift lever.

The transmission is a semi-automatic unit with close steps (26% average) between the gear ratios which is necessary to maintain a high engine r.p.m. for maximum fuel economy and vehicle speed. This compact design allows a twelve speed transmission package to be produced which is comparable in weight and envelope size to the present day five speed transmissions. This twelve speed transmission is slightly wider, shorter and has less depth than the aforementioned five speed transmission. This minimum space requirement is vital to the truck manufacturer in his efforts to obtain the maximum amount of pay load in the minimum amount of space.

While the drawings illustrate a transmission structure embodying the invention having twelve forward and six reverse ratios, it will be obvious that the invention may be adapted to other applications wherein different numbers of forward and reverse ratios are desired.

*Transmission Gearing*

Figure 1:
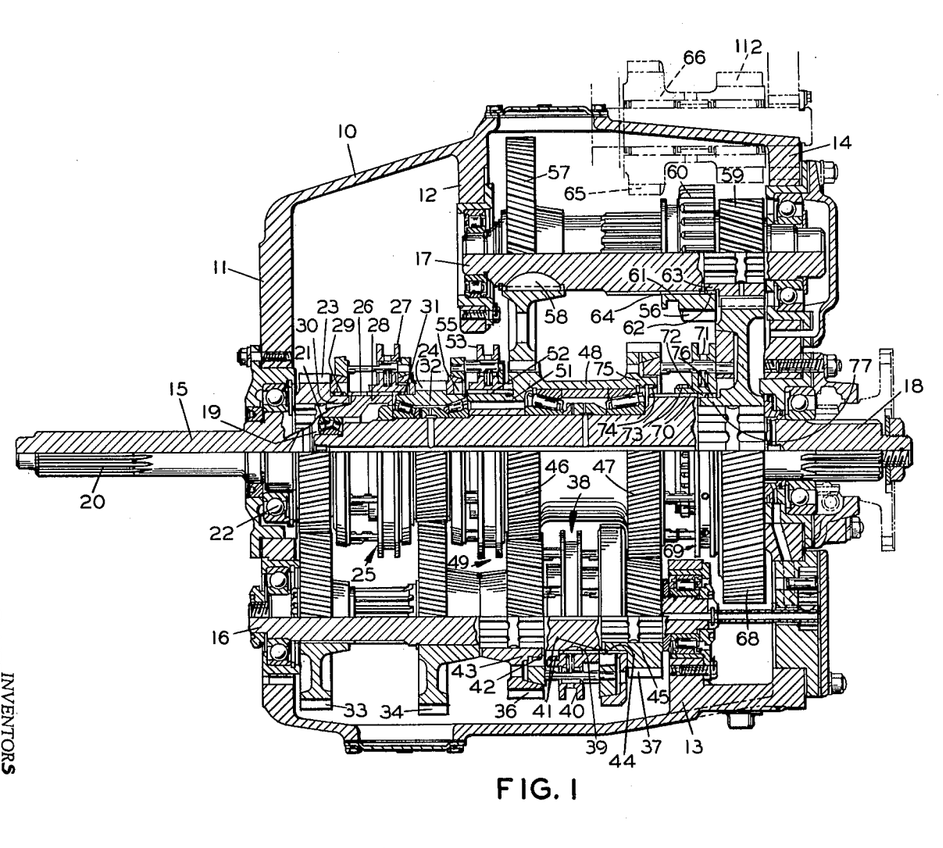
FIG. 1 is a sectional view taken substantially along line 1—1 of FIG. 3 illustrating the transmission gearing embodied in this invention.

In FIG. 1 a transmission case 10 having a front wall 11, intermediate transverse walls 12 and 13, and a rear wall 14, are provided with suitable apertures to support an input shaft 15, a pair of countershafts 16 and 17, and an output or mainshaft 18 parallel to and in spaced relation to the input shaft 15. The output shaft 18 and input shaft 15 are axially aligned. All of these shafts are rotatably supported in the transmission case 10 except for one end of the output shaft 18 which is piloted in a bearing 21 as at 19 within the inward end of the input shaft 15.

The input shaft 15 is adapted to be connected to a source of power by means of its splined end 20 through a friction clutch (not shown) and is supported by a bearing 22 in the front wall 11 of the case 10. The input shaft 15 rotatably carries an input gear 23. A clutch gear 24 is rotatably carried on the output shaft 18 adjacent to and rearward of the input gear 23. These gears may be alternately connected in a driven relationship to the input shaft 15 by means of a synchronizing device in the form of a positive dual clutch assembly designated in its entirety at 25. The synchronizing device 25 is splined as at 26 to the input shaft 15, and is consequently rotatable therewith. A sliding shift collar 27 having internal teeth 28 is adapted for selective engagement with a series of teeth 29 provided on a hub 30 forming part of the input gear 23 or with a series of teeth 31 mounted on a hub 32 forming part of the clutch gear 24.

The input gear 23 and the clutch gear 24 are in constant mesh with a pair of drive gears 33 and 34 respectively which are splined or keyed to the countershaft 16. Thus, it will be seen that when the shift collar 27 is moved to its left-hand position as seen in FIG. 1 the internal teeth 28 will engage the teeth 29 of the hub 30 and operatively connect the input gear 23 to the drive gear 33. Similarly, when the shift collar 27 is moved to its right-hand position so that the teeth 28 engage the teeth 31 on the hub 32, the clutch gear 24 will be operatively connected to the drive gear 34. The synchronizing mechanism 25 per se is of conventional design. Therefore, no description is considered necessary, its function being to gradually bring the various rotative parts which are to be connected together up to the same speed of rotation prior to effecting a final shift of the collar 27. A shift fork 35, see FIG. 2, is provided for the purpose of effecting the selective movement of the shift collar 27.

The first countershaft 16 is a high speed or high range countershaft and further, rotatably carries change speed gears 36 and 37. Either of these gears may be connected in a driven relationship to the high speed countershaft 16 by means of a synchronizing device in the form of a positive dual clutch assembly designated in its entirety at 38. The synchronizing device 38 is splined as at 39 to the countershaft 16, and is rotatable therewith. A sliding shift collar 40 having internal teeth 41 is adapted for selective engagement with a series of teeth 42 provided on a hub 43 forming part of the gear 36 or with a series of teeth 44 mounted on a hub 45 forming part of the gear 37.

Figure 3:
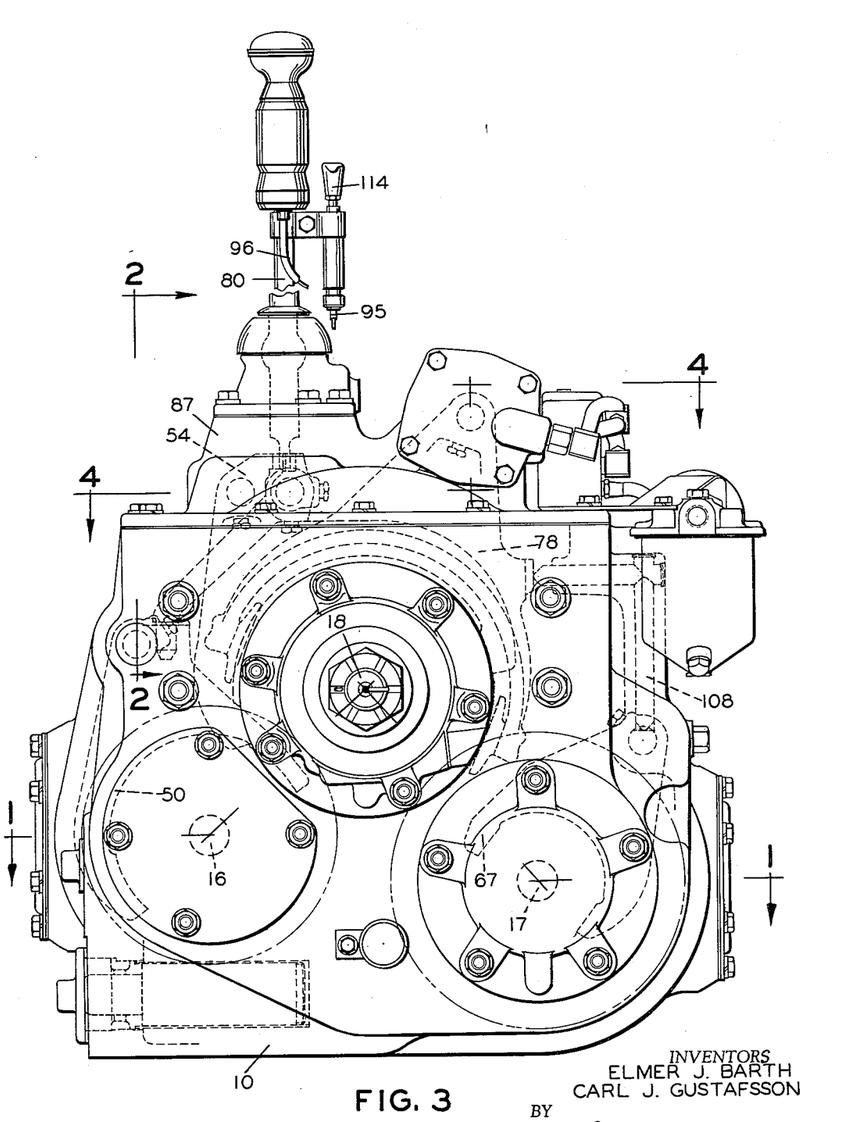
FIG. 3 is a rear elevation view of the transmission assembly showing the shafts in their proper relationship.

The change speed gears 36 and 37 are in constant mesh with gear portions 46 and 47 respectively, of a cluster gear 48 which is rotatably carried on the output shaft 18. Therefore, it will be seen that when the shift collar 40 is moved to its left-hand position as seen in FIG. 1, the internal teeth 41 will engage the teeth 42 of the hub 43 and operatively connect the gear 36 to the cluster gear portion 46. Similarly, when the shift collar 40 is moved to its right-hand position so that the teeth 41 engage the teeth 44 on the hub 45, the gear 37 will be operatively connected to the cluster gear portion 47. A shift fork 50, see FIG. 3, is provided for effecting the selective movement of the shift collar 40.

Figure 2:
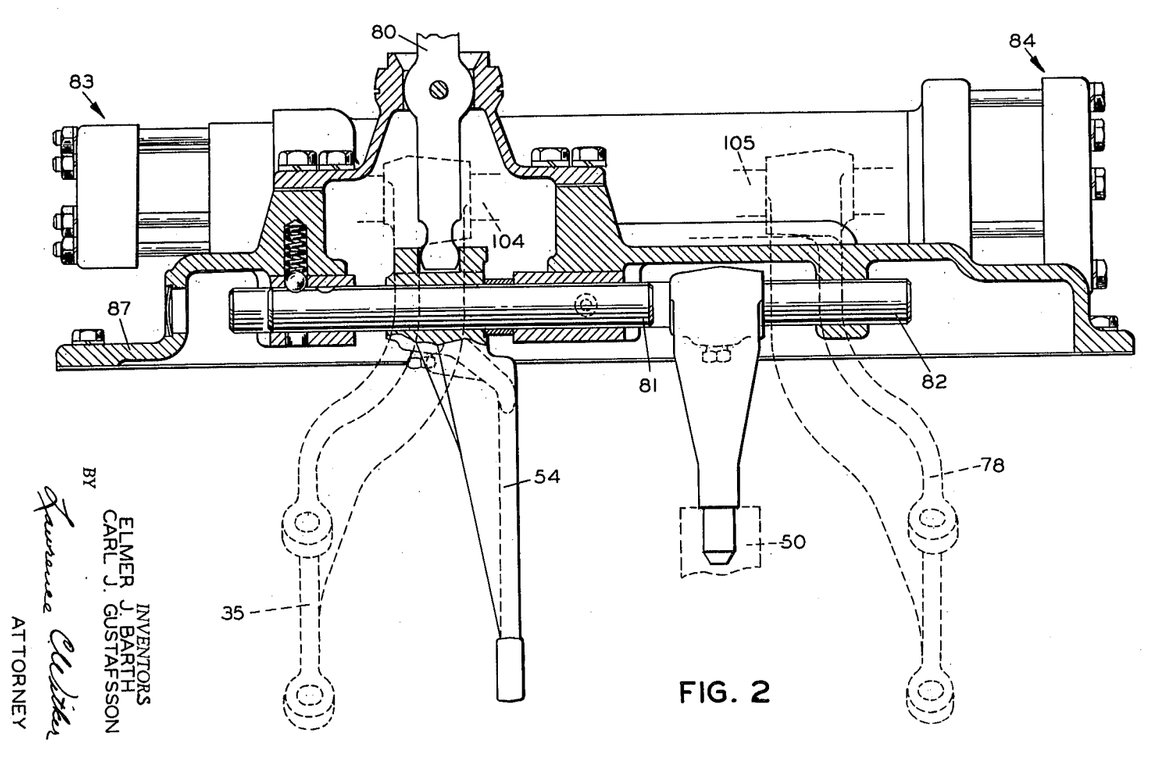
FIG. 2 is a longitudinal view, partially in section, taken substantially along line 2—2 of FIG. 3 illustrating a portion of the shifting mechanism.

A synchronizing device in the form of a single positive clutch assembly designated in its entirety at 49 includes a hub 51 which is splined as at 52 to one end of the cluster gear 48 and includes a shift collar 53 mounted on the hub 51 and movable by means of a yoke 54, see FIG. 2, from a disengaged position to a position wherein it is in engagement with a series of teeth 55 provided on the hub 32 forming part of the clutch gear 24. It will be seen that when the shift collar 53 is moved to its left-hand position as shown in FIG. 1, it will serve to operatively connect the cluster gear 48 to the clutch gear 24 and that when it is in its right-hand position, the cluster gear 48 will be disconnected from the clutch gear 24.

The second countershaft 17 is a low speed or low range countershaft and carries a drive gear 57 drivingly connected, as at 58, thereto. The drive gear 57 is in constant mesh with the cluster gear portion 46. Rotatably carried on the low speed countershaft 17 is a change speed gear 59 which may be connected in a driven relationship thereto by means of a positive sliding clutch gear 60. The sliding clutch gear 60 is splined as at 64 to the countershaft 17 and is consequently rotatable therewith. The clutch gear 60 is provided with internal teeth 61 for selective engagement with a series of teeth 62 provided on a hub 63 forming part of the gear 59 or with a gear portion 65 of a reverse idler gear cluster 66 by means of the gear teeth 56.

The sliding clutch gear 60 is further provided with a neutral position located between its two engaged positions whereby the transmission can be operated while the vehicle is stationary. It is obvious that when the clutch gear 60 is in its extreme left-hand position as viewed in FIG. 1, the reverse idler gear cluster 66 will be operatively connected to the sliding clutch gear 60, that when the clutch gear 60 is moved to its middle position it is disengaged and when it is moved to its right-hand position the internal teeth 61 will engage the teeth 62 on the hub 63, the gear 59 will be drivenly connected to the countershaft 17. A shift fork 67, see FIG. 3, is provided for effecting the selective movement of the clutch gear 60.

The output shaft 18 rotatably carries an output gear 68 which is in constant mesh with the change speed gear 59. Either the output gear 68 or the cluster gear 48 may be connected in a driving relationship to the output shaft 18 by means of a synchronizing device in the form of a positive dual clutch assembly designated in its entirety at 69. The synchronizing device 69 is splined as at 70 to the output shaft 18, and is therefore rotatable therewith.

A sliding shift collar 71 having internal and external teeth 72 and 73 respectively is adapted for selective engagement with a series of internal teeth 74 provided on a hub 75 forming part of the cluster gear 48 or with a series of teeth 76 mounted on a hub 77 forming part of the output gear 68. It will be seen that when the shift collar 71 is moved to its left-hand position as seen in FIG. 1 the external teeth 73 will engage the internal teeth 74 of the hub 75 and operatively connect the cluster gear 48 to the output shaft 18. Similarly, when the shift collar 71 is moved to its right-hand position so that the internal teeth 72 engage the teeth 76 on the hub 77, the output gear 68 will be operatively connected to the output shaft 18. A shift fork 78, see FIG. 2, is provided for the purpose of effecting the selective movement of the shift collar 71.

Although FIG. 1 is an expanded cross sectional view, all of the gears are shown in their proper meshing engagement with the exception of the reverse cluster gear 66, which is shown in phantom. Bearing in mind that the gear portion 112 of the reverse cluster gear 66 is in constant mesh with the output gear 68, FIG. 1 can be used to trace the twelve forward and six reverse ratios.

Shift Mechanism

In general, the shift mechanism consists of two independently operated levers, each having a neutral position. One of the levers conditions the transmission for forward, neutral and reverse operation and the other lever is for changing the various gear ratios in the aforementioned forward, neutral and reverse positions.

Figure 4:
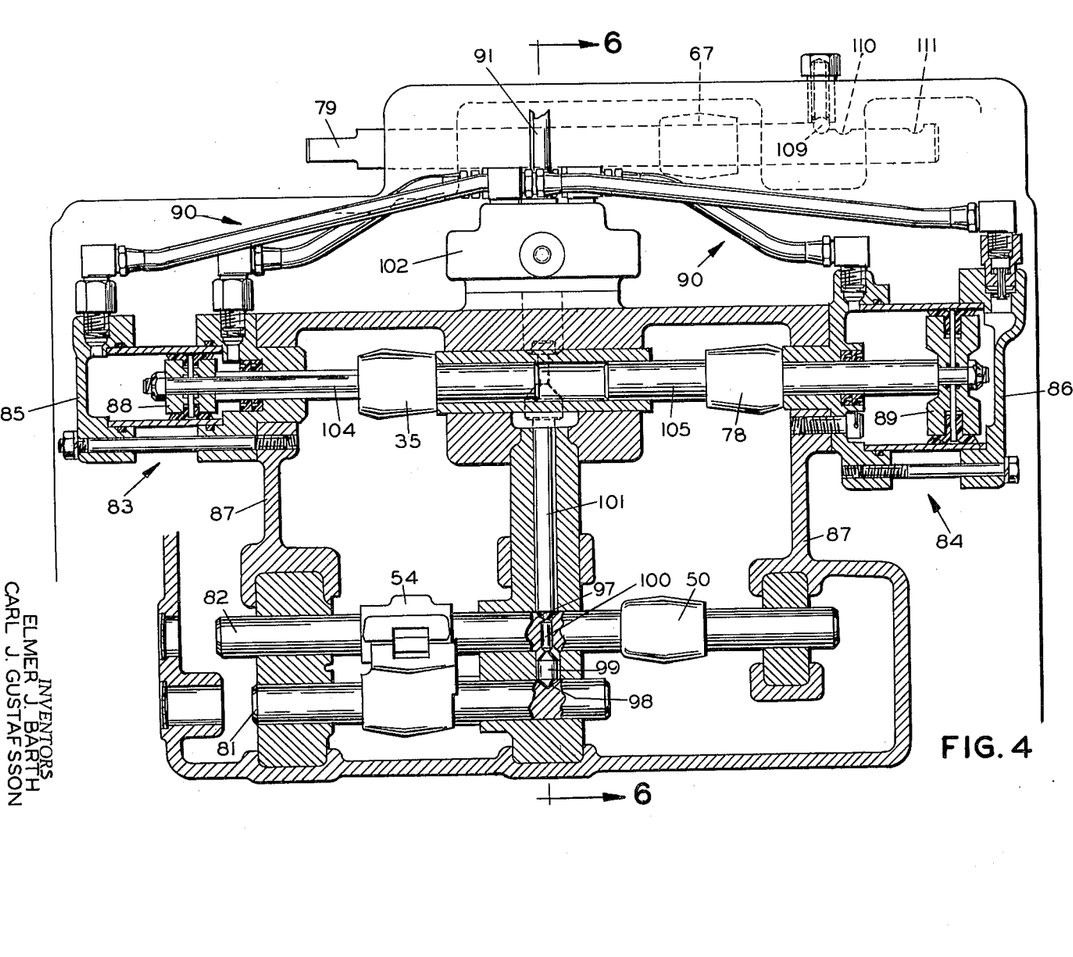
FIG. 4 is a view, partially in section, taken substantally along line 4—4 of FIG. 3 showing the shift rods.

Referring now to FIG. 4, an individual selector lever, not shown, may be connected by a flexible cable or any other suitable means to a shift rod 79 on which is mounted the shift fork 67 for the shifting of the sliding gear clutch 60. The neutral position of this lever permits the vehicle to remain stationary while the gear 57 mounted on the countershaft 17 is used to drive a side mounted power take-off. This control further permits the driver to maneuver the vehicle forward or backward without changing the position of the gear shift lever 80.

Figure 7:
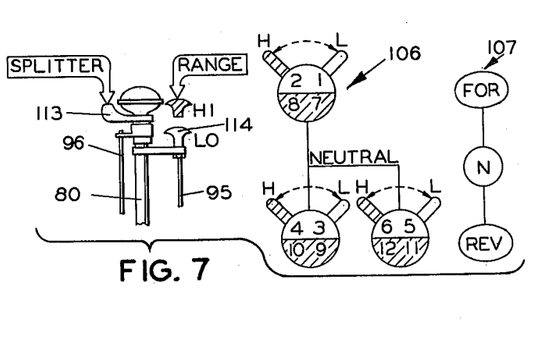
FIG. 7 is a diagrammatic view of the shift pattern.

Since this transmission might simply be described as a three speed, hand shifted gear set equipped with an input splitter which is power shifted, and an output splitter which is also power shifted, all twelve ratios may be obtained with the gear shift lever 80 in only three positions, note the shift diagram 106 in FIG. 7. This easy-to-use diagram allows the driver to obtain the proper gear ratios either in forward or reverse quickly and easily for all driving requirements.

The gear shift lever 80 is provided with means at its lower end for selectively engaging shift rods 81 and 82. Suitable means are provided for locking one or the other of the rods from shifting when either of the rods is in a shifted position. This locking means also forms part of the connection for controlling the flow of power to the fluid motors which operate the input and output splitter mechanisms, indicated as a whole by the reference numerals 83 and 84, respectively.

Figure 5:
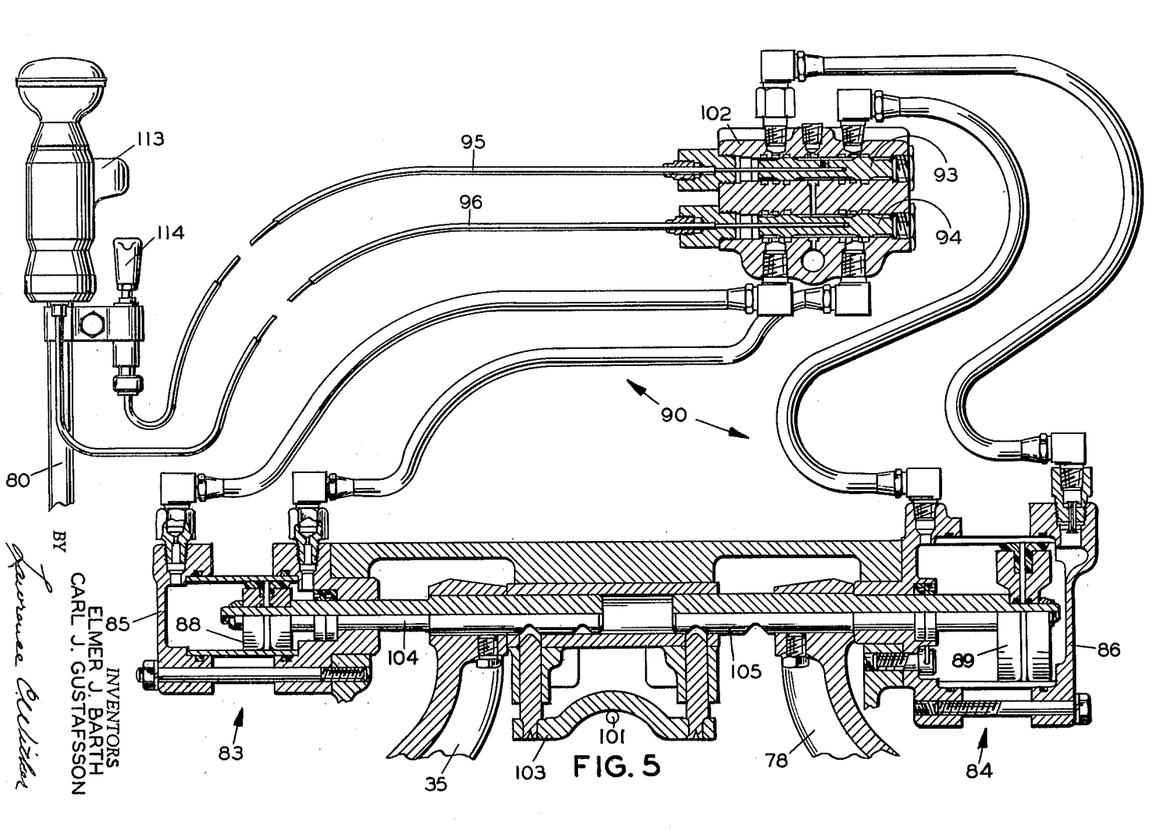
FIG. 5 is a diagrammatic view, partially in section, illustrating the power shifting mechanism.
Figure 6:
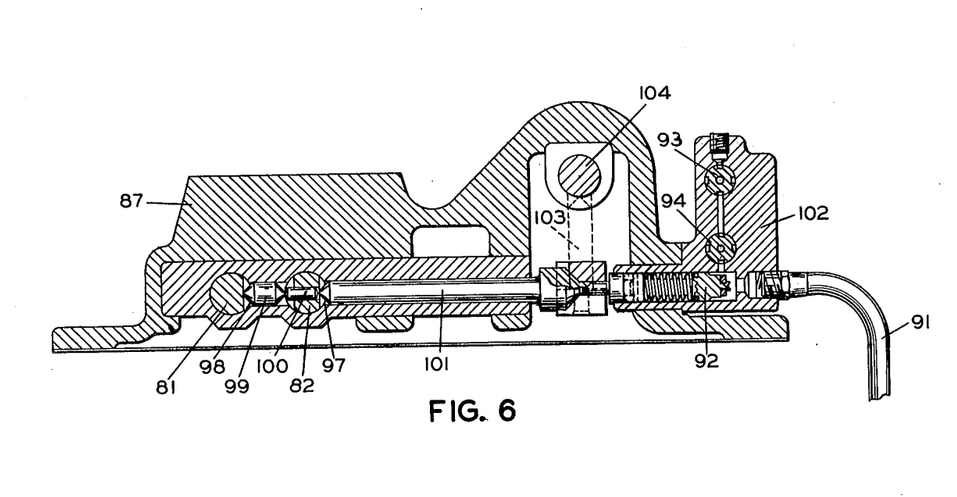
FIG. 6 is a view taken substantially along line 6—6 of FIG. 4 showing a mechanism for controlling the power shifting mechanism.

The means for operating the input and output splitters 83 and 84 respectively, that is the shifting sections 27 and 71 respectively thereof, are double acting pressure or fluid operated motors comprising cylinders 85 and 86, mounted on the transmission cover 87, pistons 88 and 89 in the cylinders 85 and 86 respectively, and connected to the forks 35 and 78, which in turn are operatively connected to the shifting sections 27 and 71, a conduit system, indicated as a whole by reference numeral 90, connected to the cylinders 85 and 86, and to a source of power 91 and control valve means 92 (see FIG. 6) in said conduit system 90, and operated preferably by the shift rods 81 and 82. The valve means 92 is operated to open position, that is, the conduit system 90 is open to the power fluid, when one of the shift rods is moved to neutral position. The valve means 92 is moved to closed position when the shift rods 81 and 82 are moved into a shifted position. As seen in FIG. 5, the valve means is further provided with slides 93 and 94 which serve to connect either end of the cylinders 85 and 86 to the source of power 91. These slides are connected by means of cables 95 and 96 to manually operable means 113 and 114 respectively, located on the gear shift lever 80 for preselecting the desired gear ratios.

A series of interlocks are provided between the shift mechanism and the transmission gearing to insure safe and efficient operation of the transmission.

As clearly shown in FIG. 4 with the shift lever 80 in its neutral position, notches 97 and 98 in the shift rods 81 and 82 are aligned. This permits a poppet 99, interlock pin 100 and an interlock rod 101 to move away from the control valve body 102. The interlock parts 99, 100 and 101 are moved out of engaged position by the fluid pressure acting on the valve 92. When the interlock rod 101 is moved from its engaged position (see FIGS. 5 and 6), interlock bridge 103 drops down to release the shift rods 104 and 105 of the power shifted elements 83 and 84. The fluid pressure that opened the valve 92 is now free to pass into the power cylinders 85 and 86. Movement of either shift rail 81 or 82 out of its neutral position will displace the interlock rod 101 causing the interlock bridge 103 to engage and lock the shift rods 104 and 105 from shifting and also cut off the incoming fluid pressure.

Referring briefly to FIG. 7, it will be noted that there are two separate shift patterns 106 and 107; namely, one pattern 107 having forward, neutral and reverse positions and the other pattern 106 having four positions for changing the gear ratios including the forward, neutral and reverse positions of pattern 107. The gear ratios of the last mentioned shift pattern 106 are divided between a low and high range of speed ratios and the splitter 83. The low range includes first, second, third, fourth, fifth and sixth speeds for forward, neutral and reverse operation of the transmission, while the high range includes seventh, eighth, ninth, tenth, eleventh and twelfth speeds for forward operation of the transmission only.

Due to the fact that the cluster gear 48 is the focal point for all the power flowing through the transmission, it will be noted that the input power terminates at this cluster gear 48 carried on the mainshaft 18. The output power emanates from the cluster gear 48 and may be diverted into the countershaft 17 for first through sixth speeds, or coupled directly to the mainshaft 18 for seventh through twelfth speeds.

Instead of one drive gear meshing with one countershaft driven gear, as in a conventional transmission, two input drive gears 23 and 24 mesh with two driven gears 33 and 34 respectively, on the countershaft 16. The synchronizer 25 located between the two input drive gears 23 and 24 is power shifted and clutches one or the other to the input drive shaft 15. A splitter shift is made for every gear change if the transmission is shifted progressively from first through twelfth speeds. With this arrangement, two different input ratios may be used with the basic three-speed hand shifted gear set.

A power shifted synchronizer 69 is located between the cluster gear 48 and the gear 68 and clutches one or the other to the mainshaft 18 for final output drive. This shift is made only once during a progressive shift pattern from first through twelfth speed. With this arrangement, two different output ranges may be used in conjunction with the six gear ratios obtained from the input splitter 83 and the basic three speed, hand shifted gear set.

The power cylinders 85 and 86 which do the actual shifting of the input and output splitters 83 and 84 are double acting. The power fluid is admitted or exhausted from each end of the cylinders 85 and 86 through a inside this valve determines whether the power fluid is admitted or exhausted from the cylinders 85 and 86. The position of the slides 93 and 94 inside the control valve 92 may be selected by the driver when it is necessary or desirable to effect a change of ratios.

*Low Range, Forward, Neutral and Reverse*

Referring to FIGS. 1 and 2 specifically, the low range speed ratios are effected by actuation of the shift fork 78 rearwardly, to the right in FIG. 2, which simultaneously shifts the shift collar 71 to the right in FIG. 1 also. Shifting of the shift collar 71 locks the output gear 68 to the mainshaft 18. With the shift fork 78 in this position interlock pin 108, see FIG. 3, is disengaged from the shift rail 79, thus allowing the shift rail 79 to be moved to any one of its three positions. Referring now to FIG. 4, the shift rail 79 is shown so that the clutching gear 60 locks the gear 59 to the countershaft 17. If the shift rail 79 is moved to the left in FIG. 4 so that the poppet 109 engages notch 110, the clutching gear 60 will be disengaged from the gear 59 whereby the transmission is neutralized from the vehicle. This allows a side mounted power take-off to be operated from the gear 57 at all six speeds available in low range. When the shift rail 79 is further moved, to the left in FIG. 4, so that the poppet 109 engages notch 111, the clutching gear 60 will mesh with a reverse idler gear 65, thereby conditioning the transmission for reverse operation.

*Low Range—First Speed*

The transmission is conditioned for low range, forward operation by locking output gear 68 to the mainshaft 18 and gear 59 to the countershaft 17 as previously described. The input splitter shift fork 35 is shifted rearwardly, to the right in FIGS. 1 and 2, causing the shift collar 27 to clutch the gear 24 to the input shaft 15. The manually actuated shift fork 50 is also shifted rearwardly causing the shift collar 40 to clutch gear 37 to the countershaft 16.

Figure 8:
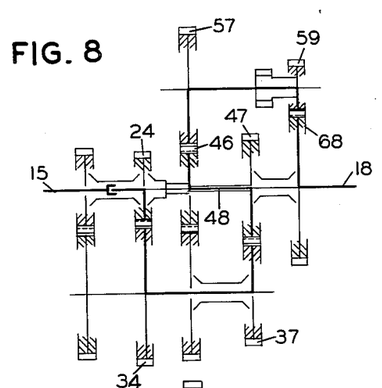
FIGS. 8 through 19 are diagrammatic views showing the various gear trains utilized in this embodiment of the invention.

The power flow in first speed, see FIG. 8, is through the following gears in the order recited: from the input shaft 15 to the clutch gear 24, rotatably carried on the mainshaft 18, to the drive gear 34 keyed to the countershaft 16, to change speed gear 37 clutched to countershaft 16 which meshes with gear portion 47 of the cluster gear 48 rotatably carried on mainshaft 18, to drive gear 57 keyed to countershaft 17, to gear 59 clutched to countershaft 17, to gear 68 clutched to mainshaft 18 thence out the driven mainshaft 18.

*Low Range—Second Speed*

Second speed is obtained by shifting the input splitter shift fork 35 forwardly, to the left in FIGS. 1 and 2, causing the shift collar 27 of the synchronizing clutching assembly 25 to clutch the gear 23 to the input shaft 15, thereby locking the gear 23 to the input shaft 15.

Figure 9:
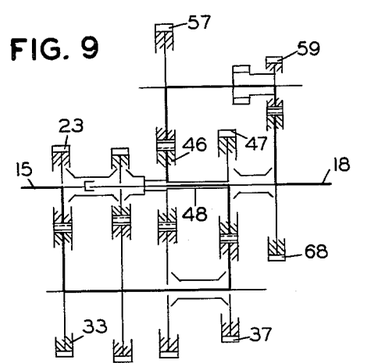

The power flow for second speed, see FIG. 9, is substantially the same as first speed except that gear 23 and its meshing gear 33 are used in place of the clutch gear 24 and the drive gear 34.

*Low Range—Third Speed*

For third speed the input splitter shift fork 35 is moved rearwardly coupling the input shaft 15 and the clutch gear 24 together as previously described for the first speed.

The manually actuated shift fork 50 is shifted forwardly coupling the change speed gear 36 to the countershaft 16 as previously described.

Figure 10:
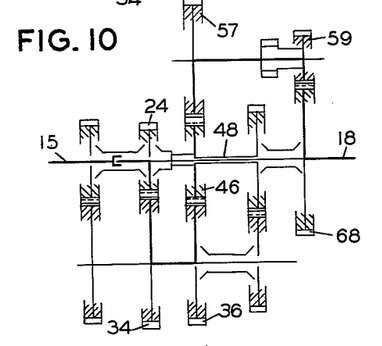

The power flow for third speed, see FIG. 10, is then through the following gears in the order recited: from the input shaft 15 to the clutch gear 24, to the drive gear 34, to the change speed gear 37, to the forward gear portion 46 of the mainshaft cluster gear 48, to the drive gear 57, to the gear 59, to the mainshaft output gear 68 and out the driven mainshaft 18.

Low Range—Fourth Speed

The fourth speed gear ratio is obtained by moving the input splitter shift fork 35 forward as previously described in second speed.

Figure 11:
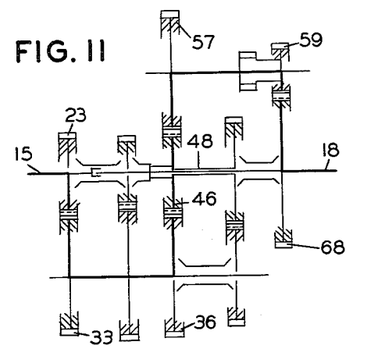

The flow of power is then substantially the same as third speed except, see FIG. 11, that the gear 23 and its mating counterpart drive gear 33 replaces the clutch gear 24 and the drive gear 34 combination.

Low Range—Fifth Speed

Fifth speed ratios are obtained by shifting the input splitter shift fork 35 rearwardly. This causes the input shaft 15 to be coupled to the clutch gear 24 as previously described. The manually actuated shift fork 54 is shifted forwardly to the left in FIGS. 1 and 2, moving the shift collar 53 of the interposed synchronizing assembly 49 in the same direction. The shift collar 53 straddles the clutching teeth 55 of the clutch gear 24 and the mainshaft cluster gear 48 thereby coupling said cluster gear 48 to the clutch gear 24. The shift fork 50 is in its neutral position, thereby isolating the countershaft 16.

Figure 12:
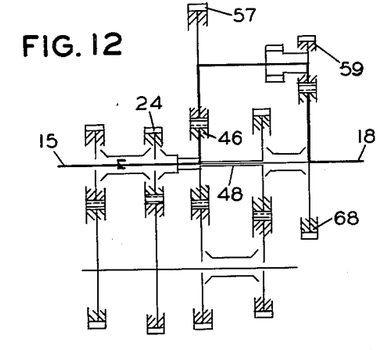

The power flow, see FIG. 12, is then from the input shaft 15 to the clutch gear 24, to the forward gear portion 46 of the mainshaft cluster gear 48, to the drive gear 57, to the speed gear 59, to the output gear 68, and thence out the driven mainshaft 18.

Low Range—Sixth Speed

The input splitter shift fork 35 is shifted forwardly, to the right in FIGS. 1 and 2 which simultaneously shifts the shift collar 27 in the same direction causing the gear 23 to become clutched to the input shaft 15 as explained before.

Figure 13:
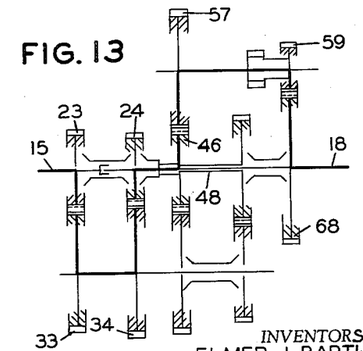

Therefore, the flow of power of the sixth speed, see FIG. 13, differs from the fifth speed power flow only in the use of the input gear 23, front drive gear 33 combination, and the clutch gear 24, rear drive gear 34 combination.

High Range—Forward

The next six ratios are effected by the actuation of the shift fork 78 being shifted forwardly, to the left in FIGS. 1 and 2. This causes the shift collar 71 to straddle the clutching teeth 74 on the internal periphery of the cluster gear 48 and the splined teeth 70 of the mainshaft 18 thereby locking the cluster gear 48 to the mainshaft 18.

High Range—Seventh Speed

The input splitter shift fork 35 is shifted rearwardly, to the left in FIGS. 1 and 2, and simultaneously moves the shift collar 27 in the same direction. The shift collar 27 straddles the spline teeth 26 of the input shaft 15 and the clutching teeth 31 of the clutch gear 24 thereby locking the input shaft 15 to the clutch gear 24 as previously described.

The manually actuated shift fork 50 is also moved rearwardly and causes the shift collar 40 to clutch the change speed gear 37 to the countershaft 16, as heretofore described.

Figure 14:
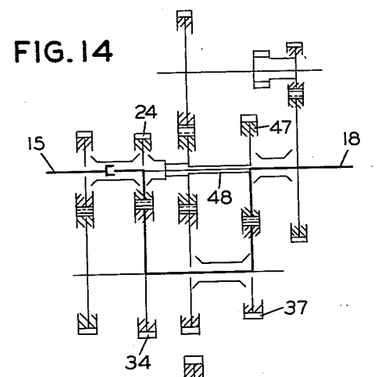

The power flow for seventh speed is then through the following gear train, see FIG. 14, in the order recited: from input shaft 15 to the clutch gear 24, to the drive gear 34, to the change speed gear 37, to gear portion 47 of the cluster gear unit 48, then out the driven mainshaft 18.

High Range—Eighth Speed

The high range eighth speed ratio follows a pattern similar to the seventh speed ratio, the only difference being that the input splitter shift fork 35 is shifted forwardly, thereby disengaging clutch gear 24 from and engaging input gear 23 to the input shaft 15.

Figure 15:
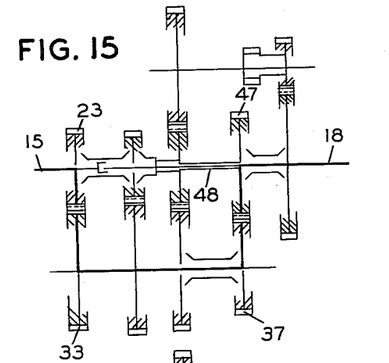

The power flow, see FIG. 15, is then from the input shaft 15, to the input gear 23, through the front drive gear 33, from which point on the flow of power is the same as that described for seventh speed.

High Range—Ninth Speed

For ninth speed the input splitter shift fork 35 is shifted rearwardly causing the clutch gear 24 to be locked to the input shaft 15.

The shift fork 50 is shifted forwardly, thereby joining the change speed gear 36 to the mainshaft 18.

Figure 16:
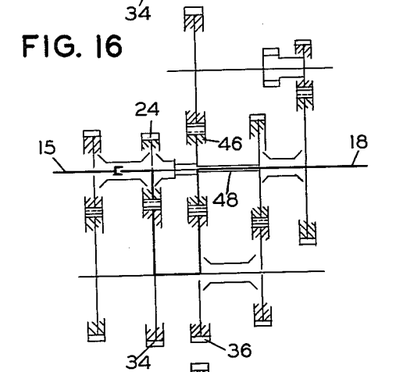

The power flow, see FIG. 16, is then through the input shaft 15, the clutch gear 24, the drive gear 34, the change speed gear 36, the forward gear portion 46 of the mainshaft cluster gear 48 and out the driven mainshaft 18.

High Range—Tenth Speed

Tenth speed is practically the same as ninth speed except that the input splitter shift fork 35 is shifted forwardly unlocking the clutch gear 24 and locking the input drive gear 23 to the input shaft 15.

Figure 17:
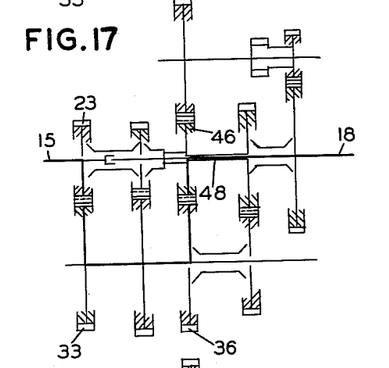

The power flow, see FIG. 17, is then through the input drive gear 23 to the front drive gear 33 then through the same path as ninth speed.

High Range—Eleventh Speed

Eleventh speed is the direct drive of the transmission unit. The input splitter shift fork 35 is moved rearwardly thereby clutching the input shaft 15 to the clutch gear 24. Shift fork 54 is moved rearwardly to the right in FIGS. 1 and 2 clutching the mainshaft cluster gear 48 to the clutch gear 24.

Figure 18:
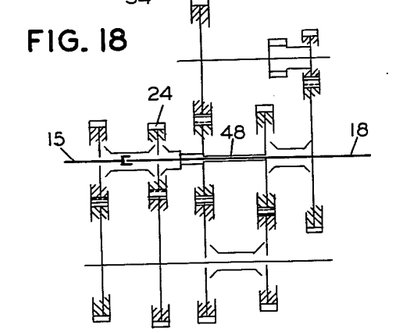

The power flow, see FIG. 18, is then from the input shaft 15, to the clutch gear 24, through the cluster gear 48 and out the driven mainshaft 18.

High Range—Twelfth Speed

Twelfth speed is similar to eleventh speed except that the input splitter shift fork 35 is moved in a forwardly direction uncoupling the clutch gear 24 and coupling the input gear 23 to the input shaft 15.

Figure 19:
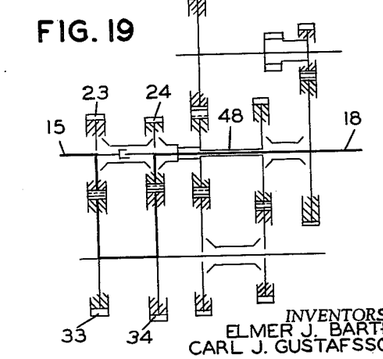

The power flow, see FIG. 19, is then from the input drive gear 23, to the front drive gear 33, to the rear drive gear 34, to the clutch gear 24 and out the driven mainshaft 18, as explained above.

A transmission having twelve forward and six reverse speeds is thus provided by using a freely rotatable cluster gear on the output shaft as the focal point of the output power in conjunction with a pair of countershafts which are parallel to and in a spaced relationship to the output shaft. This arrangement reduces the axial length required for a transmission of this speed range, which is vital in the effort of getting a maximum amount of pay load in a minimum amount of space in a vehicle.

It will be obvious that various changes in the details, which have been herein described and illustrated in order to explain the nature of this invention, may be made by those skilled in the art within the principles and scope of the invention as expressed in the appended claims.

What is claimed is:

1. In a transmission, the combination of a drive shaft, a driven shaft, a pair of countershafts, means for providing a relatively low speed range between said drive and driven shafts through both of the countershafts and including a first synchronizing clutch engageable to condition the transmission for the low speed range, means for providing a higher speed range between said drive and driven shafts through one of the countershafts and including the first synchronizing clutch engageable to condition the transmission for the higher speed range, means for providing a plurality of speed ratios between the drive and driven shafts having close steps therebetween in either the low or high speed ranges and including a second synchronizing clutch, means for providing a direct drive between said drive and driven shafts and including the second and a third synchronizing clutch engageable to condition the transmission for the direct drive, and means for providing a forward and reverse drive speed range between the said drive and driven shafts through both of said countershafts and including means for permitting the reverse drive to be engageable in only the low speed range and further including a positive clutch engageable to condition the transmission for the forward and reverse drive.

2. A change speed transmission comprising an input shaft, a high speed countershaft, a low speed countershaft, an output shaft, driving gears carried on the input shaft and output shaft, synchronizing clutch means to selectively connect the driving gears in a driven relationship to the input shaft, a pair of drive gears drivingly connected to the high speed countershaft and meshing with the driving gears carried on the input and output shafts, a pair of change speed gears carried on the high speed countershaft, a second synchronizing clutch means to selectively connect the change speed gears in a driven relationship to the high speed countershaft, an output gear carried on the low speed countershaft, a second output gear carried on the output shaft and meshing with said output gear on the low speed countershaft, a cluster gear carried on the output shaft provided with one gear portion meshing with one of said change speed gears, another gear portion of said cluster gear meshing with the other change-speed gear, one of said gear portions further meshing with a low speed countershaft driving gear, a third synchronizing clutch means to selectively connect the second output gear or the cluster gear to the output shaft, and a positive clutch engageable to connect the first output gear to the low speed countershaft to condition the transmission for forward drive.

3. A change speed transmission comprising a casing containing a drive shaft, a first countershaft, a second countershaft, and a driven shaft, a driving gear carried on the drive shaft, another driving gear carried on the driven shaft, clutch means to selectively connect the driving gears in a driven relationship to the driving shaft, drive gears drivingly connected to said first countershaft and meshing with the driving gears carried on the drive and driven shafts, change speed gearing carried on said first countershaft, a cluster gear carried on the driven shaft having gear portions for meshing with said change speed gearing of said first countershaft, a drive gear drivingly connected to the said second countershaft and meshing with one of said gear portions of said cluster gear, an output gear carried on said second countershaft, a second output gear carried on the driven shaft, and meshing with said output gear on said second countershaft and clutch means on the first countershaft and said driving and driven shafts including the first mentioned clutch means to selectively include any of the change speed gears in the power train.

4. In a change speed transmission, the combination comprising a drive shaft, a driven shaft, a pair of countershafts parallel to said drive and driven shafts and to each other, a pair of driving gears carried on the drive and driven shafts and adapted to be selectively connected to the drive shaft, a pair of drive gears drivingly connected to one of said countershafts and meshing with said driving gears on said drive and driven shafts, change speed gearing carried on said one countershaft and adapted to be selectively connected thereto, a cluster gear carried on the driven shaft and adapted to be selectively connected thereto, said cluster gear meshing with said change speed gearing on said one countershaft, a drive gear drivingly connected to the other countershaft and meshing with said cluster gear, an output gear on said other countershaft, another output gear on said driven shaft adapted to be selectively connected thereto and clutch means disposed on at least three of said shafts to selectively include any of the gearing in the power train.

5. A change speed transmission comprising a drive shaft, a driven shaft, a first and second countershaft parallel to said drive and driven shafts and to each other, a first gear group adapted to receive power from said drive shaft, a second gear group on said driven shaft and said first countershaft and adapted to receive power from said first gear group, a third gear group disposed on said second countershaft and said driven shaft, and means selectively operative to direct the flow of power from said second gear group through said third gear group, said last named means also being selectively operative to direct the flow of power from said second gear group directly to said driven shaft.

6. A change speed transmission comprising a drive shaft, a driven shaft, a first and second countershaft parallel to said drive and driven shafts and to each other, a first gear group adapted to receive power from said drive shaft, a second gear group on said driven shaft and said first countershaft, means operative to supply power through said first gear group to said second gear group, means operative to supply power from said drive shaft directly to said second gear group, a third gear group disposed on said second countershaft and said driven shaft, and means selectively operative to direct the flow of power from said second gear group through said third gear group, said last named means also being selectively operative to direct the flow of power from said second gear group directly to said driven shaft.

7. A change speed transmission comprising a drive shaft, a driven shaft, a first and second countershaft parallel to said drive and driven shafts and to each other, a first gear group on said drive shaft, driven shaft, and first countershaft, a second gear group on said driven shaft and said first countershaft, clutch means selectively operative to supply power through said first gear group to said second gear group, clutch means selectively operative to supply power from said drive shaft to said second gear group, a third gear group disposed on said second countershaft and said driven shaft, and clutch means selectively operative to direct the flow of power from said second gear group through said third gear group, said last named clutch means also being selectively operative to direct the flow of power from said second gear group directly to said driven shaft.

8. A change speed transmission comprising a drive shaft, a driven shaft, a first and second countershaft parallel to said drive and driven shafts and to each other, a first gear group adapted to receive power from said drive shaft, a second gear group on said first countershaft and said driven shaft and including a cluster gear, means operative to supply power from said first gear group through the second gear group to the cluster gear, means operative to supply power from said drive shaft to said cluster gear, a third gear group disposed on said second countershaft and said driven shaft, and means selectively operative to direct the flow of power from said cluster gear through said third gear group, said last named means also being selectively operative to direct the flow of power from said cluster gear directly to said driven shaft.

9. A change speed transmission comprising a drive shaft, a driven shaft, a first and second countershaft parallel to said drive and driven shafts and to each other, a first gear group on said drive shaft, driven shaft, and first countershaft, a second gear group on said driven shaft and said first countershaft, first clutch means on said driving shaft operative to supply power through selected gears of said first gear group to said second gear group, second clutch means on the driven shaft operative to supply power directly from said drive shaft to said second gear group, a third gear group disposed on said second countershaft and said driven shaft, and a third clutch means disposed on said driven shaft operative to direct the flow of power from said second gear group through said third gear group, and said third clutch means also being operative to direct the flow of power from said second gear group directly to said driven shaft.

10. A change speed transmission comprising a drive shaft, a driven shaft, a first and second countershaft parallel to said drive and driven shafts and to each other, a first gear group adapted to receive power from said drive shaft, a second gear group on said driven shaft and said first countershaft, means operative to supply power through said first gear group to said second gear group, means operative to supply power from said drive shaft directly to said second gear group, a third gear group disposed on said second countershaft and said driven shaft, and means selectively operative to direct the flow of power from said second gear group through said third gear group.

11. A change speed transmission comprising a drive shaft, a driven shaft, a first and second countershaft parallel to said drive and driven shafts and to each other, a first gear group on said drive shaft, driven shaft, and first countershaft, a second gear group on said driven shaft and said first countershaft, clutch means selectively operative to supply power through said first gear group to said second gear group, clutch means selectively operative to supply power from said drive shaft to said second gear group, a third gear group disposed on said second countershaft and said driven shaft, and clutch means selectively operative to direct the flow of power from said second gear group through said third gear group.

12. A change speed transmission comprising a drive shaft, a driven shaft, a first and second countershaft parallel to said drive and driven shafts and to each other, a first gear group adapted to receive power from said drive shaft, a second gear group on said first countershaft and said driven shaft and including a cluster gear, means operative to supply power from said first gear group through the second gear group to the cluster gear, means operative to supply power from said drive shaft to said cluster gear, a third gear group disposed on said second countershaft and said driven shaft, and means selectively operative to direct the flow of power from said cluster gear through said third gear group.

References Cited in the file of this patent
UNITED STATES PATENTS

| | | |
|---|---|---|
| 2,356,522 | Kummich | Aug. 22, 1944 |
| 2,640,374 | Willis | June 2, 1953 |
| 2,654,268 | Perkins | Oct. 6, 1953 |

UNITED STATES PATENT OFFICE
CERTIFICATE OF CORRECTION

Patent No. 3,046,807

July 31, 1962

Elmer J. Barth et al.

It is hereby certified that error appears in the above numbered patent requiring correction and that the said Letters Patent should read as corrected below.

Column 5, line 74, after "through a" insert -- control valve 92. The position of the slides 93 and 94 --; column 6, line 55, strike out "control valve 92. The position of the slides 93 and 94".

Signed and sealed this 4th day of December 1962.

(SEAL)
Attest:

ERNEST W. SWIDER
Attesting Officer

DAVID L. LADD
Commissioner of Patents